(12) United States Patent
Weindorf et al.

(10) Patent No.: US 10,871,693 B2
(45) Date of Patent: Dec. 22, 2020

(54) CURVED SEGMENTED ACTIVE DIMMABLE LENS FOR A DISPLAY SYSTEM

(71) Applicant: Visteon Global Technologies, Inc., Van Buren Township, MI (US)

(72) Inventors: Paul Fredrick Luther Weindorf, Novi, MI (US); Elijah Auger, Farmington Hills, MI (US); Qais Sharif, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/732,870

(22) Filed: Jan. 2, 2020

(65) Prior Publication Data

US 2020/0209657 A1 Jul. 2, 2020

Related U.S. Application Data

(60) Provisional application No. 62/787,658, filed on Jan. 2, 2019.

(51) Int. Cl.
*G02F 1/137* (2006.01)
*G02F 1/1335* (2006.01)
*G02F 1/1339* (2006.01)
*G02F 1/1343* (2006.01)

(52) U.S. Cl.
CPC ............ *G02F 1/137* (2013.01); *G02F 1/1339* (2013.01); *G02F 1/13439* (2013.01); *G02F 1/133528* (2013.01); *G02F 2202/04* (2013.01)

(58) Field of Classification Search
None
See application file for complete search history.

(56) References Cited

U.S. PATENT DOCUMENTS

| 5,220,442 A | 6/1993 | Dingwall et al. |
| 2008/0218434 A1* | 9/2008 | Kelly ................ G02B 27/01 345/8 |

FOREIGN PATENT DOCUMENTS

| EP | 2983040 A1 | 2/2016 |
| JP | 2018088010 A | 6/2018 |

OTHER PUBLICATIONS

Partial European Search report issued in Application No. EP20150038.6-1210 dated Mar. 6, 2020.

* cited by examiner

*Primary Examiner* — James A Dudek
(74) *Attorney, Agent, or Firm* — Quinn IP Law (57) ABSTRACT

Various displays may benefit from suitable lenses. For example, certain vehicle displays may benefit from a curved, segmented, active-dimmable lens. According to certain embodiments, a system may include a segmented indium-tin-oxide layer. The system may also include a rigid lens disposed over the segmented indium-tin-oxide layer. The rigid lens may be curved.

20 Claims, 3 Drawing Sheets

CURVED SEGMENTED ACTIVE DIMMABLE LENS FOR A DISPLAY SYSTEM

CROSS REFERENCE TO RELATED APPLICATIONS

This application claims the benefit of U.S. Provisional Patent Application No. 62/787,658, filed on Jan. 2, 2019, and entitled "CURVED SEGMENTED ACTIVE DIMMABLE LENS," which is incorporated by reference in its entirety in this disclosure.

TECHNICAL FIELD

The present disclosure generally relates to visibility of electronic displays, and in particular to a curved segmented active dimmable lens for use with a display system.

BACKGROUND

An automotive vehicle may include a display for conveying graphical information to one or more occupants in a vehicle. The display may be positioned in a dashboard of the vehicle. In the vehicle, the display may be part of an instrument cluster or an infotainment system. The display may include a flat screen.

As electronic displays are utilized increasingly in automotive instrument clusters, original equipment manufacturers seek to hide the display opening and present a "seamless" appearance to the user such that the user cannot see any apertures or margin gaps around the display. The seamless lens hides the location of the display in an unlit condition, often referred to as a "dead front", "secret until lit", "black panel" or "dark panel" effect. In addition, the original equipment manufacturers seek to minimize an appearance of the rectangular display opening in an "on" condition caused by a back-luminance leakage of the display. Organic light emitting diode displays minimize the "on" condition leakage. However, the organic light emitting diode displays do not have sufficient luminance capability to utilize a neutral density film in front of the displays to generate a seamless dark panel effect.

SUMMARY

This section provides a general summary of the disclosure and is not a comprehensive disclosure of its full scope or all its features, aspects or objectives.

According to one or more embodiments, a system may include a segmented indium-tin-oxide layer. The system may also include a rigid lens disposed over the segmented indium-tin-oxide layer. The rigid lens may be curved. The transmission rate of the curved lens element is variable in one or more segmented regions.

In one or more embodiments, a display system includes a control circuit and a display in communication with the control circuit operable to generate an optical signal. An active dimmable lens cooperates with the display to receive the optical signal. The active dimmable lens includes a curved cover layer having a first surface and an opposing second surface and an active cell disposed adjacent the second surface of the cover layer operable to vary the optical signal transmitted from the display through the lens in response to a signal from the control circuit.

The active cell includes an indium-tin-oxide (ITO) common plane layer disposed on the second surface of the cover layer, one or more segmented ITO layers adjacent the ITO common plane layer, a dye-doped liquid crystal disposed between the ITO common plane layer and the one or more segmented ITO layers, and an encapsulation layer. The encapsulation layer cooperates with the ITO common plane layer to retain the dye-doped liquid crystal and one or more ITO segmented layers. A linear polarizer is disposed adjacent the encapsulation layer of the active cell and positioned between the encapsulation layer and the display.

The curved cover layer of the display is formed of a rigid optically clear substrate. The active cell includes a perimeter seal disposed between the one or more segmented ITO layers and the ITO common plane layer. The perimeter seal is configured to contain the dye-doped liquid crystal. The active cell includes ITO segmentations cooperating with the ITO common plane layer to define the one or more segmented ITO layers therebetween, wherein the ITO segmentations are non-conductive paths.

The cover layer defines a display area. A fade pattern is disposed around a periphery of the display area. The fade pattern comprises a sinusoidal fade pattern. The sinusoidal fade pattern may include a half-sinusoidal fade pattern or rely on halftone fade technology.

In one or more embodiments, a display system includes a control circuit and a display in communication with the control circuit operable to generate an optical signal. An active dimmable lens cooperates with the display to receive the optical signal. The active dimmable lens includes a curved cover layer having a first surface and an opposing second surface and defines a display area. A fade pattern is disposed around the periphery of the display area. An active cell is disposed adjacent the second surface of the cover layer operable to vary the optical signal transmitted from the display through the lens in response to a signal from the control circuit.

The active cell includes an indium-tin-oxide (ITO) common plane layer disposed on the second surface of the cover layer, one or more segmented ITO layers adjacent the ITO common plane layer and ITO segmentations cooperating with the ITO common plane layer to define the one or more segmented ITO layers therebetween, wherein the ITO segmentations are non-conductive paths. A dye-doped liquid crystal is disposed between the ITO common plane layer and the one or more segmented ITO layers. A perimeter seal is disposed between the one or more segmented ITO layers and the ITO common plane layer. The perimeter seal is configured to contain the dye-doped liquid crystal.

An encapsulation layer cooperates with the ITO common plane layer to retain the dye-doped liquid crystal and one or more ITO segmented layers. A linear polarizer is disposed adjacent the encapsulation layer of the active cell and positioned between the encapsulation layer and the display.

In one or more embodiments, an active dimmable lens for use with a display in a display system includes a curved cover layer having a first surface and an opposing second surface. An active cell is disposed adjacent the second surface of the cover layer and operable to vary an optical signal transmitted from the display.

The active cell includes an indium-tin-oxide (ITO) common plane layer disposed on the second surface of the cover layer, one or more segmented ITO layers adjacent the ITO common plane layer, a dye-doped liquid crystal disposed between the ITO common plane layer and the one or more segmented ITO layers, and an encapsulation layer. The encapsulation layer cooperates with the ITO common plane layer to retain the dye-doped liquid crystal and one or more ITO segmented layers. A linear polarizer is disposed adjacent the encapsulation layer of the active cell.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

The accompanying drawings are provided for purposes of illustration and not by way of limitation.

DETAILED DESCRIPTION

The present disclosure may have various modifications and alternative forms, and some representative embodiments are shown by way of example in the drawings and will be described in detail herein. Novel aspects of this disclosure are not limited to the forms illustrated in the above-enumerated drawings. Rather, the disclosure is to cover modifications, equivalents, and combinations falling within the scope of the disclosure as encompassed by the appended claims.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components operable to perform the specified functions.

Referring to the Figures, wherein like numerals indicate corresponding parts throughout the several views, one or more embodiments relate to a display system. The display system may convey graphical information to an occupant in a vehicle. As opposed to a single, uniform presentation, the display system may utilize segmentation to convey graphical information. For example, the display system may divide a viewing window, which may also be referred to as a display area, into two or more regions. Each region may convey graphical information that is independent of the other region (s).

One or more embodiments relate to a display system. The display system may convey graphical information to an occupant in a vehicle. As opposed to a single, uniform presentation, the display system may utilize segmentation to convey graphical information. For example, the display system may divide a viewing window, which may also be referred to as a display area, into two or more regions. Each region may convey graphical information that is independent of the other region(s). As part of the segmentation, the display system may include a segmented indium-tin-oxide layer. The system may also include a rigid lens disposed over the segmented indium-tin-oxide (ITO) layer. The rigid lens may be curved.

The system may further include an indium-tin-oxide common plane layer disposed between the segmented indium-tin-oxide layer and the rigid lens. The system may additionally include dye-doped liquid crystal disposed between the segmented indium tin-oxide layer and the indium-tin-oxide common plane layer.

The system may also include a perimeter seal disposed between the segmented indium-tin-oxide layer and the indium-tin-oxide common plane layer and may be configured to contain the dye-doped liquid crystal.

The system may also include a flexible encapsulant layer disposed on the segmented indium-tin-oxide layer opposite the rigid lens. The system may further include a linear polarizer disposed on the flexible encapsulant layer, opposite the segmented indium tin-oxide layer.

The rigid lens may define a display area. The system may further include a fade pattern disposed around a periphery of the display area. The fade pattern may include a two (2) dot pattern. The dots of the dot pattern type fade pattern may be on the order of thirty (30) microns.

The fade pattern may be a sinusoidal fade pattern. In one example, the sinusoidal fade pattern may be a half-sinusoid. The sinusoidal fade pattern may rely on halftone fade technology. Halftone may refer to a technique that simulates continuous tone imagery using dots, varying in size, spacing, or both, thereby achieving a gradient-like effect. The sinusoidal fade pattern may include a combination of sine and cosine functions.

One or more embodiments relate to a display system with a curved lens. The curved lens may include a variable transmission rate in one or more segmented regions of the curved lens. The curved lens may allow for a perfect black panel effect and curvature along one axis of the curved lens. The curvature may be a cross-car curvature, also known as a lateral curvature, or a side-to-side curvature.

One or more embodiments relate to a display system that may include a curved, segmented, active dimmable lens with an active polarizer, such as E-Tint, to actively control transmission of a display area. The system may reduce reflections in the display area to mimic black reflection characteristics of a surrounding non-display area, so that a driver or other viewer may be unable to ascertain where the display system is located within a larger non-display area. This effect may be referred to as a hidden display effect. The hidden display effect may provide a seamless transition between the surrounding non-display area and the display system.

The system may include a rigid, curved lens that is capable of being dimmed in selective regions. The interactive portion of the lens or display may be constructed of 3 polycarbonate or glass, for example. A portion of the interior side of the lens may be covered with ITO. A second surface may be operable to control the segmented dimming of the regions of the lens. The second surface may include electrically conductive and nonconductive paths. The second surface, or interactive layer, may conceal the conductive paths.

One or more embodiments may include a display system that may permit reconfigurable content, such as graphical content, on a curved surface, while also hiding the display system when it is not needed.

One or more embodiments may also have functionality to hide a location of a display system, when the display system is in an unlit condition. This effect may be referred to as dead front, secret until lit, black panel, or dark panel. In addition, one or more embodiments may minimize an appearance of a rectangular display area, when a display system is in the on condition. This may result from minimizing black luminance leakage the display system.

One or more embodiments may provide a seamless design that uses the following principles. First, one or more embodiments may use a segmented active polarizer, such as E-Tint, to actively control the transmission of a display area. Second, one or more embodiments may reduce reflections in the display area to mimic a black reflection characteristic in a surrounding non-display area. Third, one or more embodiments may use a sinusoidal fade pattern to hide a display area. Fourth, one or more embodiments may use an antiglare (AG) surface with good light scattering, low sparkle, and good image clarity characteristics. Fifth, one or more embodiments may use a rigid, curved lens as a first surface, which may also be a common plane of a liquid crystal active polarizer. ITO may be applied to an interior surface of the lens to make it electrically conductive. Sixth, one or more embodiments may use a flexible, optically clear substrate for a second layer of an active polarizer, which also has segmented ITO regions. Seventh, one or more embodiments may use a black printing layer on an interior surface of a rigid curved lens to hide the metallic tracking on a flexible substrate.

In one or more embodiments, an interactive surface, or in other words, the surface that a user or occupant may touch and view, may include glass, polycarbonate, acrylic, or other such optically clear substrate. If glass, the interactive surface may be formed under high temperature and pressure to take a curved shape. Polymeric substrates may be molded or otherwise formed into rigid curved shapes. After shaping the glass to the desired shape, ITO may be applied to the interior surface, or in other words, the surface that is not touchable or directly viewable by the user or occupant.

A second surface may control a dimming state for a display area. For example, the second surface may control dimming states over each segmented region on a lens. The second surface may include a flexible substrate, upon which ITO may be applied in one or more regions separated by nonconductive paths. Metallic tracking may be applied to connect the dimmable segmented regions to a connector, such as a flexible printed circuit (FPC) tail or the like.

The interior surface of the interactive surface may cover and conceal the metallic tracking on the flexible substrate. The covering or concealing features may rely on a sinusoidal or other type of gradient pattern applied to hide the transition from the dimmable segmented regions to a surrounding non-display area.

The flexible layer may be attached to a rigid layer such that the alignment of the dimmable segmented regions corresponds to undecorated windows on the lens. The layers may be secured with a perimeter bond. Prior to attachment of the two layers, micro spacers may be deposited between the layers to control the distance between the layers and prevent the flexible layer from collapsing and coming into direct contact with the rigid layer. A small opening may be left in a perimeter seal.

Utilizing Liquid Crystal Injection (LCI), the lens assembly may be dipped into a vat of dye doped liquid crystal such that the opening in the perimeter seal is submerged in the liquid crystal material.

Negative pressure may be applied, causing the liquid crystal material to fill a cell gap between the rigid layer, which may be a front layer, and the flexible segmented layer, which may be a rear layer. After the cell is filled, the opening in the perimeter seal may be closed to prevent the liquid crystal material from leaking out. At this point, this may result in a sub-assembly, which may be known as an Active Polarizer Cell.

In the case of an active polarizer configuration, the display system may be further optimized by applying a linear polarizer to the back of the lens sub-assembly. The transmission axis of the linear polarizer and the transmission axis of the active polarizer (in the OFF state) may be ninety degrees (90°) from one another. The linear polarizer may be a static linear polarizer. The transmission axis of the linear polarizer may be the same as a display that is installed behind the linear polarizer.

Through one or more methods, a display may be mounted behind the segmented regions, such as by utilizing perimeter bonding, Liquid Optically Clear Adhesive (LOCA) bonding, optically clear adhesive (OCA) lamination, air gap construction, or the like. In the case of air gap assemblies, optical performance may be further enhanced using one or more moth-eye films.

Optical treatments, such as Anti-Glare (AG), Anti-Fingerprint (AF), Anti-Reflection (AR), or the like, may be applied to the front, interactive surface of the lens to further improve the optical performance of the system.

As will be discussed below, an example is outlined in FIG. 1. The example of FIG. 1 may reduce reflections behind the front, first surface of the lens by using either an active polarizer, such as E-Tint. By reducing reflections after the AG surface, the display area may appear black to a viewer's eye(s) and may be similar in appearance to a surrounding, black non-display area.

Figure 1:
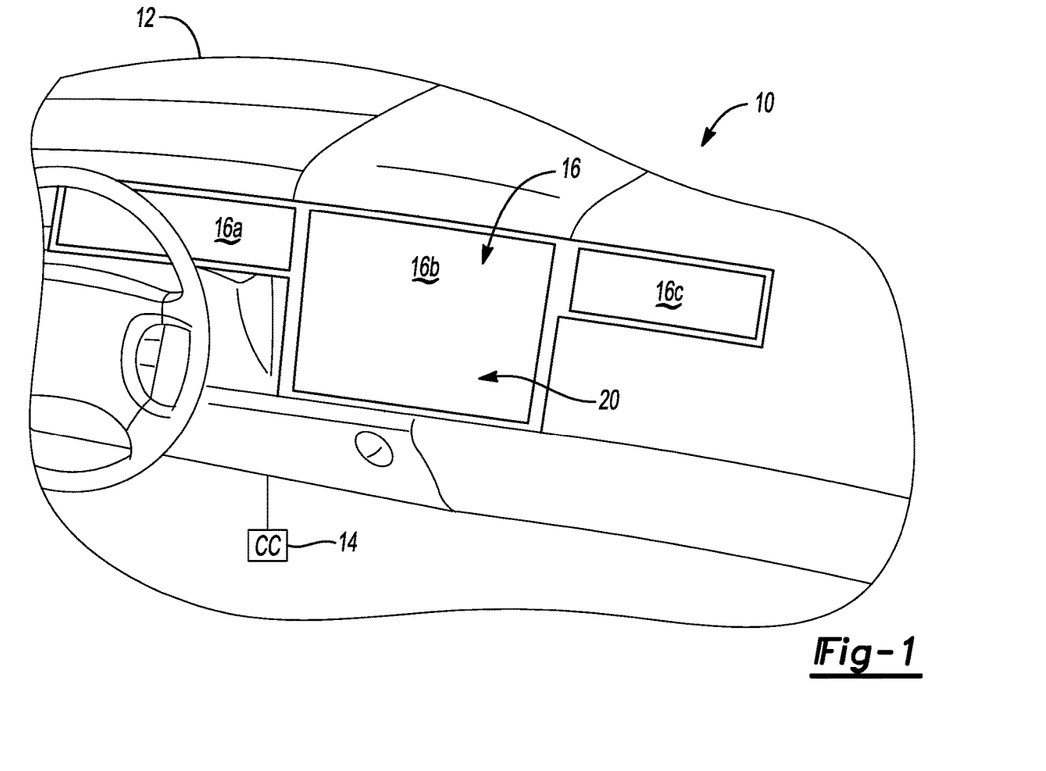
FIG. 1 is a perspective view of a display system positioned in a vehicular platform in accordance with one or more embodiments.

Referring now to FIG. 1, a display system 20 for a platform 10 is disclosed. The display system 20 is not shown or described as part of a specific application. However, it should be appreciated that the display system 20, or embodiments thereof, may be utilized in many different applications for the platform 10, such as but not limited to a vehicular application, an entertainment application, an advertising display application, etc., Exemplary vehicular applications of the platform 10 include but are not limited to automobiles, airplanes, trains, boats, motorcycles, all-terrain vehicles (ATVs), utility type vehicles (UTVs), etc. For example, the display system 20 may be incorporated into an instrument cluster, a center console display, a passenger entertainment display, or the like. The display system 20 may convey graphical information, vehicular applications, entertainment applications and the like to an occupant in the platform 10. Exemplary entertainment applications include, but are not limited to, gaming systems, televisions, computer screens, etc. In some embodiments, the platform 10 may be part of a stationary object which may include, but are not limited to, billboards, kiosks and/or marquees.

As shown in FIG. 1, an exemplary platform is a vehicle 10 generally including a dashboard or console 12, an electronic control unit or control circuit (CC) 14 and a cross cockpit display console 16. The cross-cockpit display console 16 generally includes one or more displays 16a, 16b, 16c of the display system 20. One or more of the displays 16a, 16b, 16c of the display system 20 may be located directly in front of a driver or viewer as shown by display 16a. However, as illustrated by displays 16b, 16c, the one or more displays 16 of the display system 20 may be located proximate the driver in other positions of the vehicle 10 such as in a central portion of the console 12.

The cross-cockpit display console 16 may extend across a console area of the vehicle 10. As illustrated, the display 16a may be an instrument cluster display or instrument panel console positioned for use by a driver. The display 16b may be a center console or an information display positioned on a central portion of the console 12 for use by the driver and a passenger. The display 16c may be an information display positioned for use by the passenger.

Other numbers of displays 16a, 16b, 16c and/or other locations of the displays 16a, 16b, 16c may be implemented to meet the design criteria of an application. As opposed to a single, uniform presentation, the display system 20 may utilize segmentation to convey graphical information. For example, the display system 20 may divide a viewing window, which may also be referred to as a display area, into two or more regions. Each region may convey graphical information that is independent of the other region(s). In various embodiments, all displays 16a, 16b, 16c may be dimmed uniformly and simultaneously by the active dimmable lens. In other embodiments, each display 16a, 16b, 16c may be dimmed/brightened independently of the other displays 16a, 16b, 16c by a segmented active dimmable lens.

Control signals used to generate images on the displays 16a, 16b, 16c may be received from the control circuit 14. The display system 20 may also be mounted in other locations such as, for example, within a center stack below the console 12, between the front seats, or the like. The display system 20 may be operable in an inactive or "off" state and in an active state, with one or more portions being illuminated. The control circuit 14 may receive commands and information, in the form of one or more input signals from various controls or components in the vehicle (not shown) and generate control signals that drive the one or more displays 16a, 16b, 16c of the display system 20.

In various embodiments, the control signals may be operable to provide instrumentation (e.g. speed, tachometer, fuel, temperature, etc.) to at least one display 16a of the one or more displays 16a, 16b, 16c. In some embodiments, the control signals may also be operable to provide video (e.g., a rear-view camera video, a forward-view camera video, an on-board DVD player (digital versatile disc player, etc.) to the displays 16a, 16b, 16c. In other embodiments, the control signals may be further operable to provide alphanumeric information shown on one or more of the displays 16a, 16b, 16c.

Figure 2:
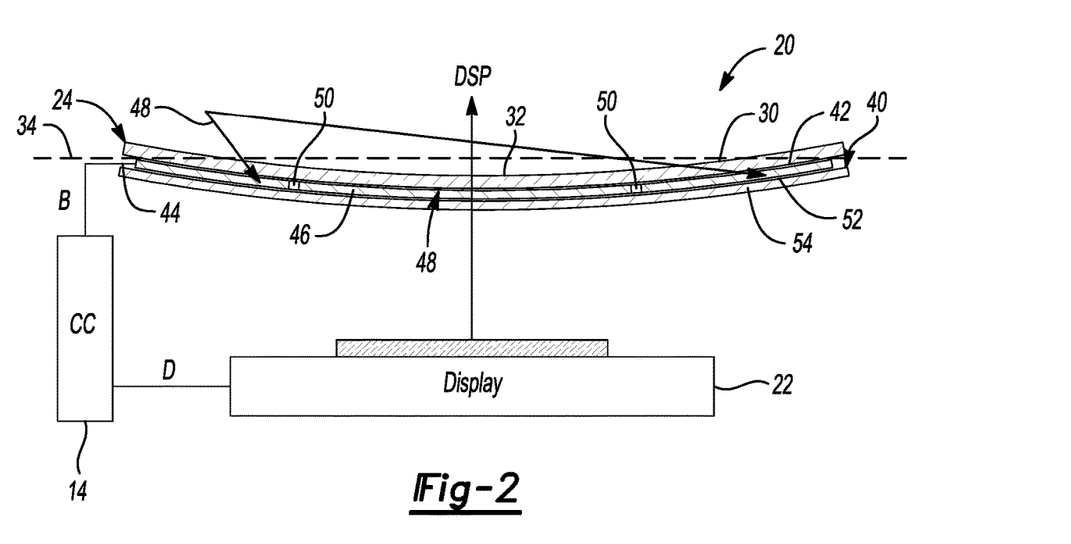
FIG. 2 is a schematic view of a display system positioned in a vehicular platform in accordance with one or more embodiments.

Referring now to FIG. 2, a schematic illustration of an exemplary display system 20 in accordance with one or more embodiments is disclosed. In some embodiments, the display system 20 may be representative of the displays 16a, 16b, 16c shown in FIG. 1. The display system 20 cooperates with the control circuit 14, a display 22 and an active dimmable lens 24. The active dimmable lens 24 may be positioned before the display 22. The active dimmable lens 24 and the display 22 may be electrically connected to the control circuit 14.

The components of the display system 20, including, but not limited to, the display 22 and active dimmable lens 24, may be coupled to the control circuit 14 in a wired or wireless manner. The control circuit (CC) 14 may implement one or more display-drive circuits. The control circuit 14 may include one or more processors, each of which may be embodied as a separate processor, an application specific integrated circuit (ASIC), or a dedicated electronic control unit.

The control circuit 14 may be any sort of electronic processor (implemented in hardware, software, or a combination of both). The control circuit 14 also includes tangible, non-transitory memory, e.g., read only memory in the form of optical, magnetic, and/or flash memory. For example, the control circuit 14 may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in memory and executed as set forth herein. The executable instructions may be a series of instructions employed to run applications on the control circuit 14 (either in the foreground or background).

An optical signal (e.g., DSP) may be generated by the display 22 and transmitted through the active dimmable lens 24. The optical signal DSP may be an optical signal that carries multiple visible images. The visible images may include words, numbers, pictures, graphical shapes, video and information related to the vehicular platform (e.g., radio, entertainment, climate control, etc.).

A display signal (e.g., D) may be generated by the control circuit 14 and received by the display 2. The display signal D may carry information used by the display 22 to modulate the optical signal DSP. The control circuit 14 may also generate a brightness signal (e.g., B) received by the active dimmable lens 24. The brightness signal B may convey control data (e.g., a voltage) used to control the dimming of the active dimmable lens 24. The brightness signal B may be implemented as multiple brightness signals B, one for each of the segments as will be defined in more detail below.

The control circuit is generally operational to generate the display information in the display signal D. The control circuit 14 may also be operational to generate and present the brightness information in the brightness signal B. In various embodiments, a separate control circuit 14 may be implemented for each display 16a, 16b, 16c shown in FIG. 1. In some designs, a single control circuit 14 may be operational to simultaneously control two or more displays 16a, 16b, 16c.

The display 22 may implement a display panel that generates the optical signal DSP. The display 22 may be a color display or a black-and-white display. The display 22 may be mounted adjacent (or adjoining) the active dimmable lens 24. The display 22 may be on an opposite side of the active dimmable lens 24 as the people. The display 22 is generally operational to change the images in the optical signal DSP in response to the display signal D. The changes generally include modulating the intensity and the color of the images. The modulated light may form the images in the optical signal DSP. In various embodiments, the display 22 may be implemented as a liquid crystal display (LCD), a thin-film transistor (TFT) liquid crystal display, an active-matrix liquid crystal display or a passive liquid crystal display with a backlighting source. Other display technologies may be implemented to meet the design criteria of an application.

The active dimmable lens 24 may implement a segmented type active dimmable lens. A segmented type active dimmable lens 24 may be operable to control the optical transmission characteristics through multiple segments (or areas) of the active dimmable lens 24. The transmission characteristics of each segment may be controlled separately.

By way of example, the active dimmable lens 24 of the displays 16a, 16b, 16c may be implemented in three segments, a segment for the display 16a, another segment for the display 16b and still another segment for the display 16c. Therefore, the driver sitting on a shaded side of the vehicle may adjust the display 16a to a preferred brightness level while the passenger sitting on a sunny side of the vehicle may adjust the display 16c to a different brightness level. In various embodiments, the active dimmable lens 24 may rigid. In other embodiments, active dimmable lens 24 may be flexible to conform to contours of a console of the vehicle.

Figure 3:
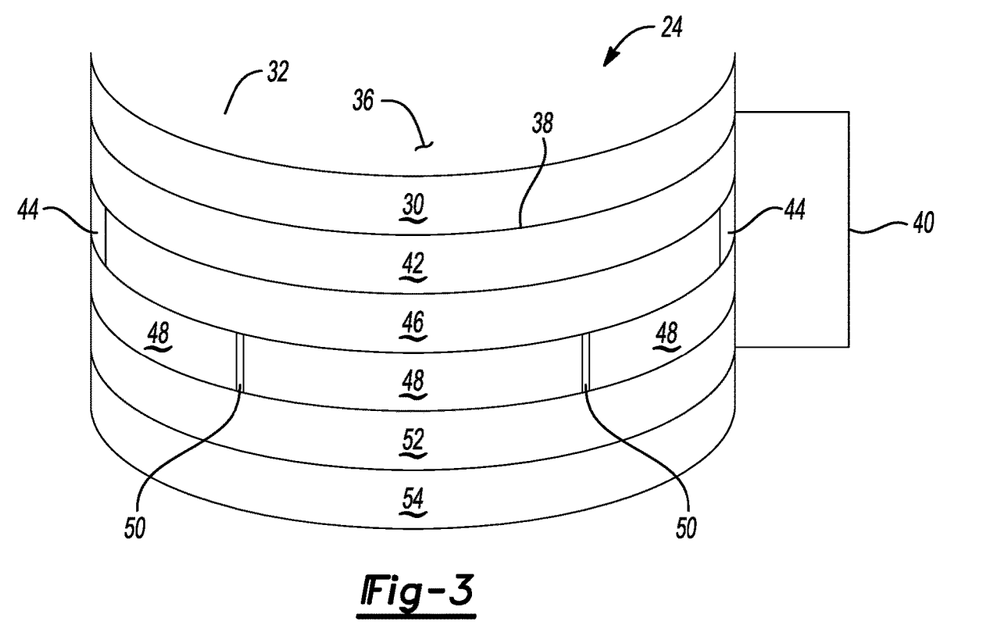
FIG. 3 is a perspective illustrative view of a display system positioned in a vehicular platform in accordance with one or more embodiments.

FIGS. 2 and 3 show an exemplary cross-section of the display system 20 having a curved active dimmable lens 24 with multiple layers disposed proximate the display 22. It is understood that the curvature, thickness, and the like of the active dimmable lens 24 are for purposes of illustration and are not drawn or described to scale.

One or more embodiments may include a display system 20 that may permit reconfigurable content, such as graphical content, on a curved surface of the lens 24, while also hiding the display system 20 when it is not needed. The curved active dimmable lens 24 may include a variable transmission rate in one or more segmented regions of the curved lens 24. The curved lens 24 may allow for a perfect black panel effect and curvature along one axis of the curved lens 24. The curvature may be a cross-car curvature, also known as a lateral curvature, or a side-to-side curvature.

One or more embodiments may also have functionality to hide a location of a display system 20, when the display system 20 is in an unlit condition. This effect may be referred to as dead front, secret until lit, black panel, or dark panel. In addition, one or more embodiments may minimize an appearance of a rectangular display area, when a display system 20 is in the on condition. This may result from minimizing black luminance leakage the display system 20.

The curved active dimmable lens 24 may include a cover layer or lens 30 defining a display area, generally referenced by numeral 32. The curved active dimmable lens 24 may be capable of being dimmed in selective regions. In an exemplary embodiment, the active dimmable lens 24 may be curved along at least one axis 34. It is understood that the active dimmable lens 24 may be curved along multiple axes 34. It is further appreciated that, where curvatures of the active dimmable lens 24 occur about multiple axes 34, that the multiple curvatures do not intersect to create a compound curvature.

The cover layer 30 may be implemented as an optically transparent layer. The cover layer 30 may provide mechanical support for the curved active dimmable lens 24. A first surface 36 of the cover layer 30 may face the passenger compartment of the vehicle 10 shown in FIG. 1. A second surface 38 of the cover layer 30 may face the display 22. Protection of the lower layers of the active dimmable lens 24 may be provided by the cover layer 30.

The cover layer 30 may be formed of one or more substances to create a substantially inelastic or rigid body or layer. In one non-limiting example, the cover layer 30 may be constructed using glass that is formed under high temperature and pressure to create the curved lens surface. Alternatively, the cover layer 30 may be formed of a polycarbonate, acrylic or other optically clear substrate material using a molding process to form the curved lens arrangement. The optically clear substrate material of the cover layer 30 allows the optical signal DSP to pass through the second surface 38 and out of the first surface 36.

In one non-limiting embodiment, an anti-glare film (not shown) may be implemented as an anti-glare neutral density film. The anti-glare film may be applied to the first surface 36 of the cover layer 30. The anti-glare film is generally operational to reduce glare caused external light incident on the display system 20. Other optical treatments, such as anti-fingerprint (AF), anti-reflection (AR), or the like, may be applied to the front, interactive surface or first surface 36 of the cover layer 30 to further improve the optical performance of the display system 20.

An active cell 40 may be positioned proximate or disposed adjacent the second surface 38 of the cover layer 30 and disposed between the cover layer 30 and the display 22. Active segmented liquid crystal technologies may be utilized together with a gradient transition pattern to foster a seamless appearance. As will be described in greater detail below, the active cell 40 may include an active polarizer cell configuration or an electronic tint ("E-tint") cell configuration.

The active cell 40 cooperates with the cover layer 30 to reduce reflections behind the first surface 36 of the cover layer 30 during operation, thereby creating an effect that the display opening area appears black to a viewer and similar in appearance to the surrounding black area. The active cell 40 of the curved active dimmable lens 24 cooperates with the display 22 to receive the optical signal DSP from the display 22 and vary a transmission of the optical signal DSP through the active cell 40 in response to a brightness signal B from the control circuit 14.

The active cell 40 includes an indium-tin-oxide (ITO) common plane layer 42 applied to or cooperating with the second surface 38 of the cover layer 30. The ITO common plane layer 42 may be applied to at least a portion of the second or interior receiving surface 38 of the lens 24. It is contemplated that the ITO common plane layer 42 is not viewable or touchable by a user of the display system 20.

In one or more exemplary embodiments, a flexible substrate may be applied to the second surface 38 of the cover layer 30 to receive the ITO common plane layer 42. Metallic tracking may be applied to the flexible substrate positioned proximate the second surface 38 of the cover layer 30. The ITO common plane layer 42 may include electrically conductive paths in one or more regions of the flexible substrate. Non-conductive paths separate the segmented one or more regions of the ITO common plane layer 42 and may be concealed on the second surface 38.

On the ITO common plane layer 42, there may be a layer defined by a perimeter seal 44 for a liquid crystal cell 46. The perimeter seal 44 may seal in a guest host dye-doped liquid crystal system, which may comprise the liquid crystal cell 46. In one non-limiting embodiment, the type of guest host can be used as an active polarizer wherein the device polarizes light in one axis in the OFF state and allows light transmission in the ON state.

The liquid crystal cell 46 of the active cell 40 may be based on a guest-host dichroic dye liquid crystal system where the guest dye acts as the polarizing element. The dye may either be orthogonal or parallel to the host liquid crystal molecules and therefore the off state may be the polarizing state or the unpolarized state. For a key-off dead-front application, the off state may be the polarizing state. An amount (density) of the dye added to the liquid crystal mixture generally affects the cell operation. As an example, if the dye density is selected for a perpendicular (e.g., dye molecules are perpendicular to the surface, unpolarized state) transmission of 70%, when the polarized state is activated the transmission may drop to about 2%.

The liquid crystal cell 46 may be disposed between the ITO common plane layer 42 and one or more segmented ITO layers 48. Different segments of the one or more segmented ITO layers 48 may be separated from one another with ITO segmentations 50. The one or more segmented ITO layers 48 and ITO segmentations 50 may be disposed within the active cell 40 and may be applied to and received by a flexible encapsulant layer 52 of the active cell 40.

In one non-limiting embodiment, the segmented ITO layers 48 are regionally applied to portions of the flexible encapsulant layer 52 in areas that correspond to areas where active control of transmission rate occurs. As shown in FIGS. 2 and 3, the flexible encapsulant layer 52 cooperates with the cover layer 30 and the perimeter seal 44 to define a cell gap receiving the liquid crystal cell 46 for the active cell 40. It is contemplated that the liquid crystal cell 46 may be assembled in the cell gap under negative pressure or a vacuum through a liquid crystal injection (LCI) process.

Transmission of the optical signals DSP through the active cell 40 may be variable in response to brightness signals applied to the one or more ITO segmented layers 48. The electrically conductive and non-conductive paths may connect the dimmable segments of the active cell 40 to a connector, such as a flexible printed circuit (FPC) tail for communication with the control circuit 14. The active cell 40, in response to the control circuit 14, may control a dimming state for the display area 32 of the cover layer 30.

Each ITO segmented layer 48 may be individually controlled by a component of the brightness signal B. When a non-zero control voltage in the brightness signal B is applied by the control circuit 14 across the one or more segmented layers 48, a portion of the active cell 40 may establish a polarization of the optical signal DSP from the display 22. A degree of the polarization may be controlled by an amplitude of the control voltage. Use of the one or more segmented layers 48 with the liquid crystal cell 46 allows the transmission of the display opening area to be adjusted dynamically to the level required for display visibility while maintaining a seamless appearance to a viewer of the display system 20.

While the one or more ITO segmented layers 48 are in the power-off condition, the polarization of light passing between the one or more ITO segmented layers 48 may be oriented relative to the polarization of a linear polarizer 54 to provide a maximum attenuation of the light (e.g., the optical signal DSP). While a maximum the control voltage is applied to one or more of the ITO segmented layers 48, the resulting polarization may align with the polarization of the linear polarizer 54 and so provide minimum attenuation of the light.

In an exemplary embodiment, the optical performance of the lens system 24 can be further improved by addition of a linear polarizer 54. The linear polarizer 54 may be static. The transmission axis of the linear polarizer 54 is aligned with the transmission axis of the display 22. When the active cell 40 is in an OFF state, the active cell 40 and the linear polarizer 54 are orthogonal to each other, wherein the active cell 40 and the linear polarizer 54 cross polarize the light or optical signal DSP generated by the display 22. In this OFF condition, near zero light or portion of the optical signal DSP passes through the cover layer 30 of the lens 24.

When the control circuit 14 places the active cell 40 in an ON condition to adjust the brightness B of the display 22, a voltage is applied to the ITO segment layers 48 in the active cell 40. The dye-doped liquid crystal cell 46 realigns within the active cell 40 in response to the applied voltage to allow the light or optical signal DSP to pass through the active cell 40 with only a minor transmission loss and then through the cover layer 30 of the lens 24.

It is contemplated that the display 22 and lens 24 of the display system 20 may be connected to each other by a bonding process, including, but not limited to, perimeter bonding, Liquid Optically Clear Adhesive (LOCA) bonding, Optically Clear Adhesive (OCA) lamination, air gap construction or the like. In the case of air gap bonding construction or assembly, optical performance may be enhanced using moth-eye films or other optical enhancement techniques.

Referring now to FIGS. 2-6, the display area 32 of the cover layer 30 of the active dimmable lens 24 may include an opaque print including an exemplary fade pattern 60 disposed around a periphery of the display area 32. The opaque print may include an opaque area surrounding the clear area. The opaque print may include a fade pattern 60 between the opaque area and the clear area. The fade pattern may serve as a transition between the opaque area and the clear area. The fade pattern may include a dot pattern. For example, the dot pattern may include columns of dots. A column may include a first dot proximal to the opaque area and distal the clear area and a second dot proximal to the clear area and distal to the opaque area. The first dot may have a dimension that is greater than the second dot. In a column, the size of the dots may taper the size of the dots from a greatest size being proximal to the opaque area to a smallest size being proximal to the clear area. The fade pattern, such as for the dot pattern, may include a sinusoidal pattern or half-sinusoidal pattern.

In one exemplary embodiment, the fade pattern 60 may be applied to the second surface 38 of the cover layer 30. The fade pattern may incorporate a two (2) dot pattern, though it is appreciated different quantity and configuration of dot patterns may be adopted to accomplish the objectives of the disclosure. The dots of the dot pattern type fade pattern 60 may be on the order of around 30 microns. The fade pattern 60 may be applied to at least partially hide or obscure the display opening from view of an occupant of the vehicle.

The fade pattern may be a sinusoidal fade pattern. In one example, the sinusoidal fade pattern may be a half-sinusoid. The sinusoidal fade pattern may rely on halftone fade technology. Halftone may refer to a technique that simulates continuous tone imagery using dots, varying in size, spacing, or both, thereby achieving a gradient-like effect. The sinusoidal fade pattern may include a combination of sine and cosine functions.

Figure 4:
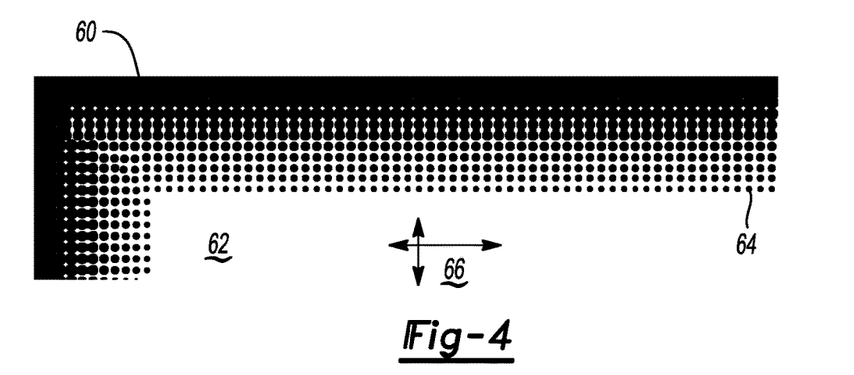
FIG. 4 illustrates a schematic diagram of a fade pattern in a corner of a clear area of an opaque print in accordance with one or more embodiments.

FIG. 4 illustrates a schematic diagram of a fade pattern 60 in a corner of the clear area 62 of the display area 32 of the cover layer 30 in accordance with one or more embodiments. The fade pattern 60 as shown in FIG. 4 is applied to an upper left corner of the display area 32 of the cover layer 30 and cooperates to define a clear area 62 of the display area 32. It is understood that that fade pattern may be applied in one or more locations of the display area 32 of the cover layer 30 to accomplish the objectives of the disclosure.

In addition to the film and display configurations, another aspect that may be added to the solution is the fade pattern 60 surrounding the clear area 62 and intruding into the active area of the display area 32. The fade pattern 60 may implement dot pattern comprising rows and columns of smaller and smaller dots 64. The fade pattern 60 may be only an example of a sinusoidal fade pattern. Other dot patterns that are not periodic and are more random in nature may be implemented to meet the design criteria of an application. A size 66 of the clear area 62 may be smaller than that of the display 22.

The center of the display area 32 may not be covered by the fade pattern 60. As such, the center of the display area 32 may not be covered by any dots. As part of the fade pattern 60, dots may be printed (or otherwise applied) in a dense pattern at and near the edges of the display area 32, becoming gradually less dense until they are discontinued. In FIG. 4, the dots of the fade pattern 60 are so large at the shown edges of the upper left corner that the display area 32 is completely opaque, with 0% light transmission. Within five millimeters (for example) of this position, the dots of the fade pattern 60 may get gradually smaller until they are discontinued. This may serve to soften the edges of the display area 32.

Figure 5:
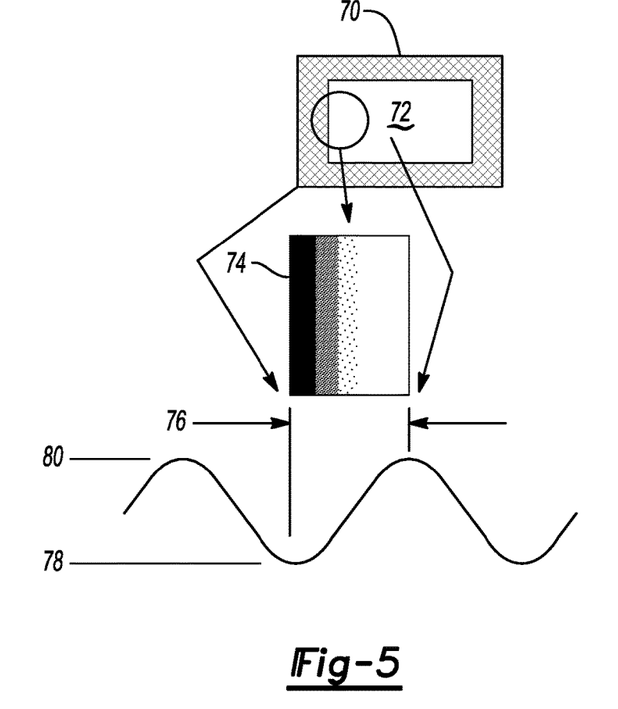
FIG. 5 illustrates a schematic diagram of a half-sinusoidal transmission fade pattern in accordance with one or more embodiments.

FIG. 5 illustrates a schematic diagram of a half-sinusoidal transmission fade pattern 70 in accordance with one or more embodiments. Half-sinusoidal fade patterns may be good fade patterns in nature. The fade pattern may be half-sinusoidal, meaning that the light transmission is at a minimum at the outside edge of the pattern and at a maximum at the inside edge of the pattern, with a variation approximating that of a sine wave. For example, light transmission T may vary with respect to distance from the edge x. If the entire width of the pattern is treated as x going from O degrees to 90 degrees, then light transmission over the width of the pattern may be expressed by $T=\sin(x)$, such that at the outside edge $x=0$ and $T=0$, whereas at the inside edge $x=90$ degrees and $T=1$.

The half-sinusoidal transmission fade pattern 70 may be implemented as a halftone fade pattern or other types of fade technologies since a sinusoidal pattern has the lowest number of Fourier spatial frequencies. The lowest sinusoidal spatial frequency may work well due to a contrast sensitivity characteristics per the Contrast Sensitivity Function (CSF) of the human eye. The half-sinusoidal transmission fade pattern 70 may be developed by several means. For example, a combination of cosine and sine functions may be used to produce the half-sinusoidal fade pattern 70 along the edge of a display opening 72. Due to fabrication feature size capabilities, a pitch of the pattern may be made small, for example, around thirty (30) micrometers, and the half-sinusoidal transmission fade pattern 70 may appear as a continuous fade pattern 74 to the eye and the periodic structure would not be seen. Spatial frequencies below about six (6) cycles per degree generally have a lower contrast sensitivity (e.g., are harder to see).

In various embodiments, a width 76 of the continuous fade pattern 74 may extend over a range of approximately three (3) millimeters (mm) to approximately seven (7) mm (e.g., five (5) mm). The continuous fade pattern 74 may range from a zero percent (e.g., no) transmission level 78 to a specified transmission level 80.

Figure 6:
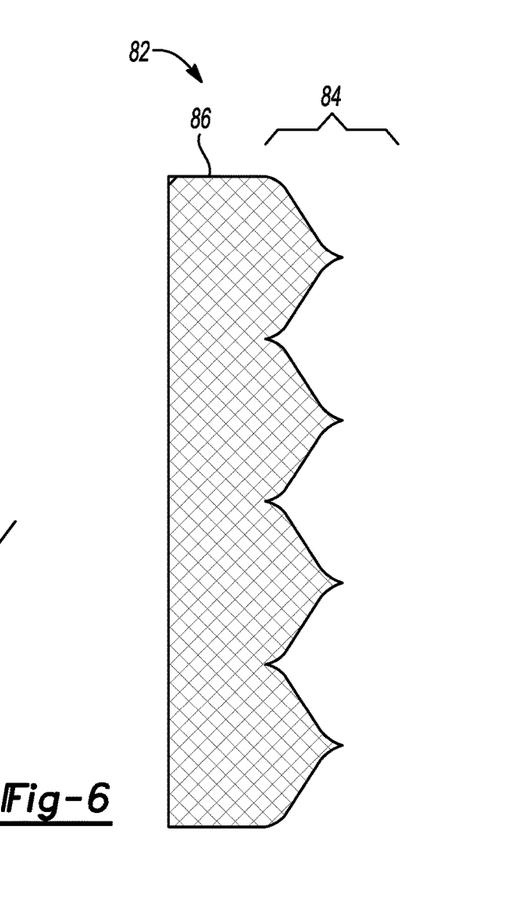
FIG. 6 illustrates a schematic diagram of a sinusoidal spatial fade pattern in accordance with one or more embodiments.
Figure 7:
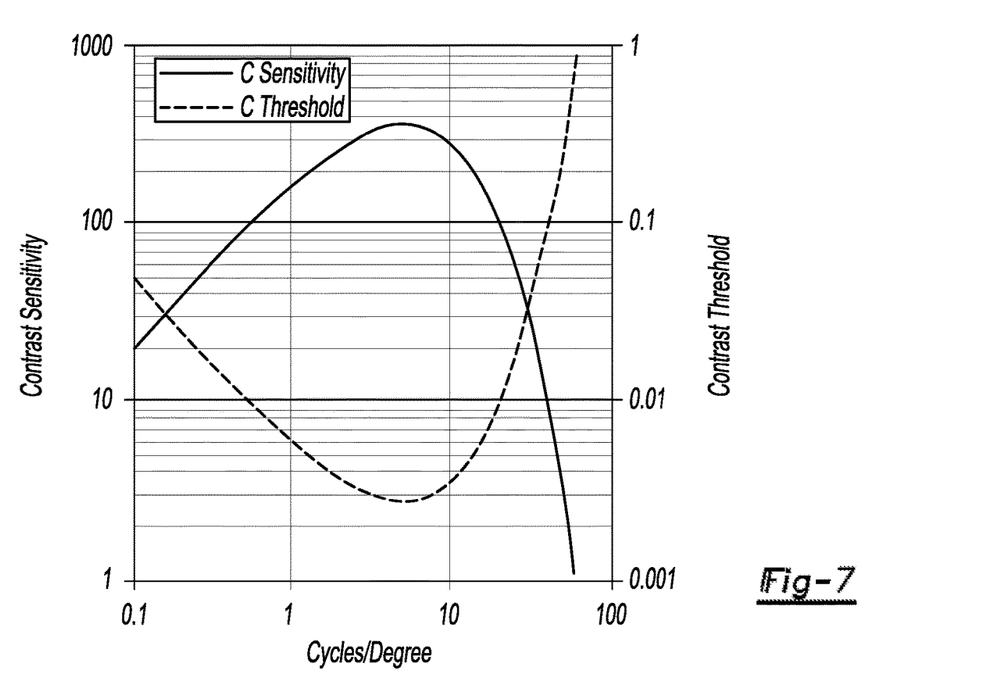
FIG. 7 is an illustration of the spatial frequencies of the contrast sensitivity and contrast threshold functions in accordance with one or more embodiments.

FIG. 6 illustrates a schematic diagram of a sinusoidal spatial fade pattern 82 in accordance with one or more embodiments. The sinusoidal spatial fade pattern 82 may include a spatially varying opaque area 84 adjoining a solid opaque area 86. The varying opaque area 84 may be spatially modulated in a series of sinusoidal patterns as shown. As shown in FIG. 7, a contrast sensitivity function of the eye shows that spatial frequencies below approximately 6 cycles per degree generally have a lower contrast sensitivity (e.g., harder to see). Note that the solid opaque area 86 of the sinusoidal fade pattern 82 may also help to hide the display border in the on condition.

The above examples have focused on a rectangular display, but the same principles may be applied to other shapes of displays, including circular displays, square displays, and so on. Other modifications to the above embodiments are permitted, as the preceding are merely non-limiting examples.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A display system comprising:
a control circuit;
a display in communication with the control circuit operable to generate an optical signal; and
an active dimmable lens cooperating with the display to receive the optical signal from the display and vary a transmission of the optical signal through the lens, wherein the active dimmable lens includes:
a curved cover layer having a first surface and an opposing second surface,
an active cell disposed adjacent the second surface of the cover layer operable to vary the optical signal transmitted from the display through the active cell in response to a signal from the control circuit, wherein the active cell includes:
an indium-tin-oxide (ITO) common plane layer disposed on the second surface of the cover layer,
one or more segmented ITO layers adjacent the ITO common plane layer,
a dye-doped liquid crystal disposed between the ITO common plane layer and the one or more segmented ITO layers, and
an encapsulation layer, wherein the encapsulation layer cooperates with the ITO common plane layer to retain the dye-doped liquid crystal and one or more ITO segmented layers, and
a linear polarizer operable to polarize the optical signal disposed adjacent the encapsulation layer of the active cell and positioned between the encapsulation layer and the display.

2. The display system of claim 1 wherein the cover layer is formed of a rigid optically clear substrate.

3. The display system of claim 1 wherein the active cell of the active dimmable lens further comprises a perimeter seal disposed between the one or more segmented ITO layers and the ITO common plane layer, wherein the perimeter seal is configured to contain the dye-doped liquid crystal.

4. The display system of claim 1 wherein the active cell of the active dimmable lens further comprises ITO segmentations cooperating with the ITO common plane layer to define the one or more segmented ITO layers therebetween, wherein the ITO segmentations are non-conductive paths.

5. The display system of claim 1 wherein the cover layer of the active dimmable lens is configured to define a display area.

6. The display system of claim 5 wherein a fade pattern is disposed around a periphery of the display area.

7. The display system of claim 6 wherein the fade pattern comprises a sinusoidal fade pattern.

8. The display system of claim 7 wherein the sinusoidal fade pattern comprises a half-sinusoidal fade pattern.

9. The display system of claim 7 wherein the sinusoidal fade pattern relies on halftone fade technology.

10. A display system comprising:
   a control circuit;
   a display in communication with the control circuit operable to generate an optical signal; and
   an active dimmable lens cooperating with the display to receive the optical signal from the display and vary a transmission of the optical signal through the lens in response to a brightness signal from the control circuit, wherein the active dimmable lens includes:
      a curved cover layer having a first surface and an opposing second surface, wherein the curved cover layer is configured to define a display area,
      a fade pattern disposed around a periphery of the display area,
      an active cell disposed adjacent the second surface of the cover layer operable to vary the optical signal transmitted from the display through the active cell in response to a signal from the control circuit, wherein the active cell includes:
         an indium-tin-oxide (ITO) common plane layer disposed on the second surface of the cover layer,
         one or more segmented ITO layers adjacent the ITO common plane layer,
         ITO segmentations cooperating with the ITO common plane layer to define the one or more segmented ITO layers therebetween, wherein the ITO segmentations are non-conductive paths,
         a dye-doped liquid crystal disposed between the ITO common plane layer and the one or more segmented ITO layers,
         a perimeter seal disposed between the one or more segmented ITO layers and the ITO common plane layer, wherein the perimeter seal is configured to contain the dye-doped liquid crystal, and
         an encapsulation layer, wherein the encapsulation layer cooperates with the ITO common plane layer to retain the dye-doped liquid crystal and one or more ITO segmented layers, and
      a linear polarizer operable to polarize the optical signal disposed adjacent the encapsulation layer of the active cell and positioned between the encapsulation layer and the display.

11. The display system of claim 10 wherein the fade pattern comprises a sinusoidal fade pattern.

12. The display system of claim 11 wherein the sinusoidal fade pattern comprises a half-sinusoidal fade pattern.

13. The display system of claim 11 wherein the sinusoidal fade pattern relies on halftone fade technology.

14. An active dimmable lens for use with a display in a display system, the active dimmable lens comprising:
   a curved cover layer having a first surface and an opposing second surface;
   an active cell disposed adjacent the second surface of the cover layer operable to vary an optical signal transmitted from the display, wherein the active cell includes:
      an indium-tin-oxide (ITO) common plane layer disposed on the second surface of the cover layer,
      one or more segmented ITO layers adjacent the ITO common plane layer,
      a dye-doped liquid crystal disposed between the ITO common plane layer and the one or more segmented ITO layers, and
      an encapsulation layer, wherein the encapsulation layer cooperates with the ITO common plane layer to retain the dye-doped liquid crystal and one or more ITO segmented layers; and
   a linear polarizer operable to polarize the optical signal from the display disposed adjacent the encapsulation layer of the active cell.

15. The active dimmable lens of claim 14 wherein the active cell further comprises a perimeter seal disposed between the one or more segmented ITO layers and the ITO common plane layer, wherein the perimeter seal is configured to contain the dye-doped liquid crystal.

16. The active dimmable lens of claim 14 wherein the active cell further comprises ITO segmentations cooperating with the ITO common plane layer to define the one or more segmented ITO layers therebetween, wherein the ITO segmentations are non-conductive paths.

17. The active dimmable lens of claim 14 wherein the cover layer of the active dimmable lens is configured to define a display area.

18. The active dimmable lens of claim 17 wherein a fade pattern is disposed around a periphery of the display area.

19. The active dimmable lens of claim 18 wherein the fade pattern comprises a sinusoidal fade pattern.

20. The active dimmable lens of claim 19 wherein the sinusoidal fade pattern comprises a half-sinusoidal fade pattern.

* * * * *